Feb. 19, 1924.

A. H. RATTERREE

CUSHION TIRE

Filed June 15, 1923

1,484,037

A. H. Ratterree, Inventor

By C. A. Snow & Co.

Attorneys

Patented Feb. 19, 1924.

1,484,037

UNITED STATES PATENT OFFICE.

ALAXANDER HOPE RATTERREE, OF CHARLOTTE, NORTH CAROLINA.

CUSHION TIRE.

Application filed June 15, 1923. Serial No. 645,635.

*To all whom it may concern:*

Be it known that I, ALAXANDER H. RAT-TERREE, a citizen of the United States, residing at Charlotte, in the county of Mecklenburg and State of North Carolina, have invented a new and useful Cushion Tire, of which the following is a specification.

This invention relates to cushion tires, the primary object of the invention being to provide a cushion tire of a construction wherein the same will be exceptionally resilient, due consideration being given to the strength and durability of the tire.

Another object of the invention is to provide a solid rubber tire formed with suitable openings to lend resiliency thereto, the openings being of a particular construction to insure against breaking of the rubber or material of which the tire is formed, at the corners of the openings.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
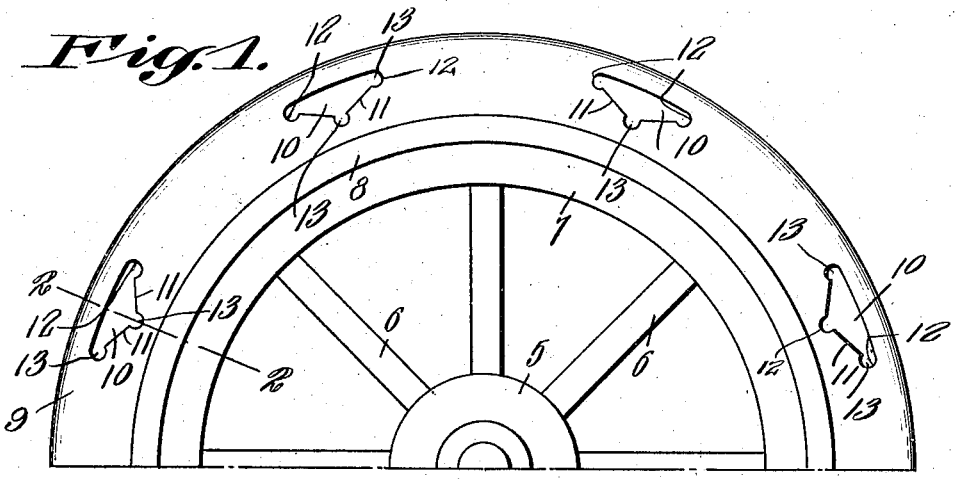
Figure 1 is a side elevational view disclosing a tire constructed in accordance with the invention.
Figure 2:
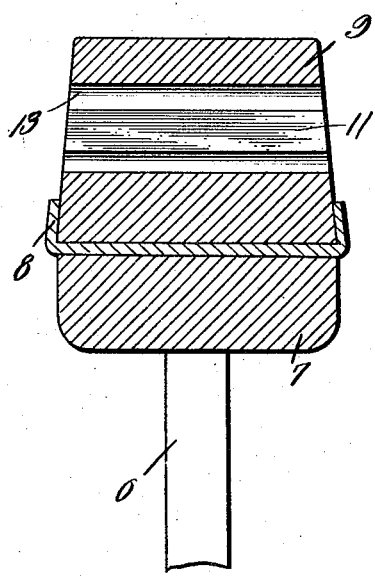
Figure 2 is a sectional view taken on line 2—2 of Figure 1.
Figure 3:
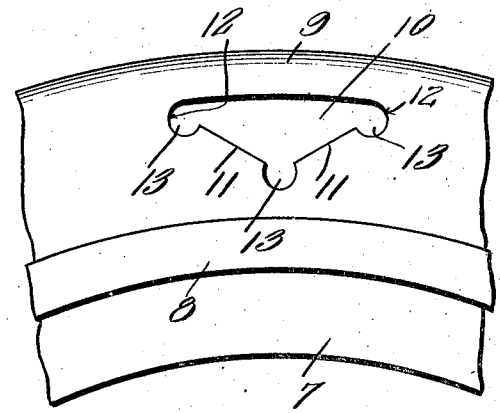
Figure 3 is an enlarged detail view disclosing the construction of the walls of the openings.

Referring to the drawing in detail, the reference character 5 designates the hub of a wheel and the reference character 6 designates the spokes radiating therefrom. These spokes are connected with the felloe 7 in the usual way, which felloe supports the rim 8 on which the tire 9, forming the essence of the invention is mounted.

The tire is of the cushion type and is formed preferably of solid rubber, there being provided openings 10 in the rubber that extend transversely therethrough, the openings being arranged in spaced relation with each other throughout the circumference of the tire.

As shown, these openings 10 are preferably substantially triangular in formation, the walls thereof being relatively straight as indicated at 11. These walls 11 are connected at their ends, by means of curved walls 12 providing spaces 13 to permit the walls to move with respect to each other, the movement being directed throughout the entire lengths of the curved walls 12.

From the foregoing it will be seen that due to this particular construction the movement of the walls of the openings caused by the tire passing over irregularities in a road surface will not be directed to a particular point at the corners of the openings but will be distributed throughout the lengths of the curved walls 12.

It might be further stated that due to this construction, the material of which the tire is formed, is strengthened at the corners of the openings, eliminating any possibility of the material breaking or tearing at the corners, to the end that the life of the tire is greatly increased, and the riding qualities of the tire greatly enhanced.

I claim:—

1. A solid tire construction having openings extending transversely therethrough, said openings being substantially triangular in formation and having reentrant curved walls at the corners of the openings.

2. A solid tire construction having openings extending therethrough, the openings including relatively straight walls, reentrant curved walls connecting the relatively straight walls, and said reentrant curved walls adapted to receive wear directed to the openings when the tire is being flexed.

In testimony that I claim the foregoing as my own, I have hereto affixed my signature in the presence of two witnesses.

ALAXANDER HOPE RATTERREE.

Witnesses:
G. T. CARSWELL,
J. M. ROSS.